Aug. 24, 1954  F. E. SEAMAN  2,686,951
MOLD FOR FABRICATING HOLLOW STRUCTURES
Filed March 6, 1952  3 Sheets-Sheet 2
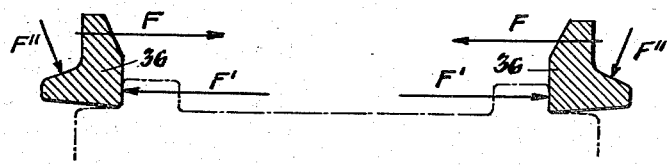
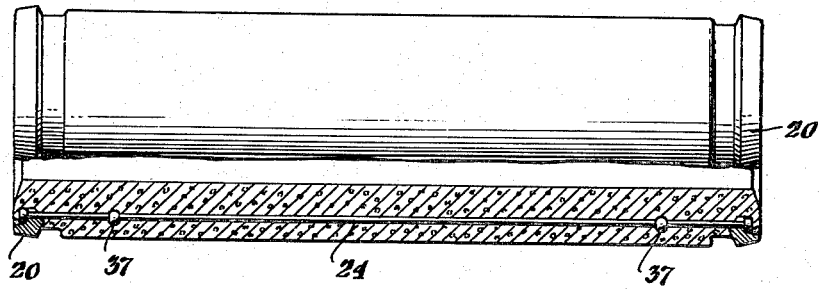
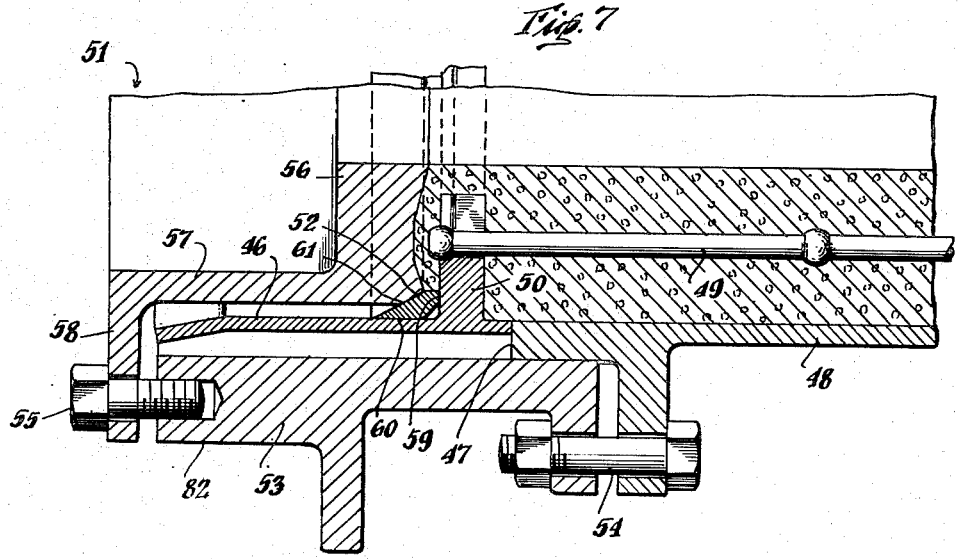
INVENTOR.
Francis Eugene Seaman
BY
George F. Des Marais
ATTORNEY Aug. 24, 1954
F. E. SEAMAN
2,686,951
MOLD FOR FABRICATING HOLLOW STRUCTURES
Filed March 6, 1952
3 Sheets-Sheet 3
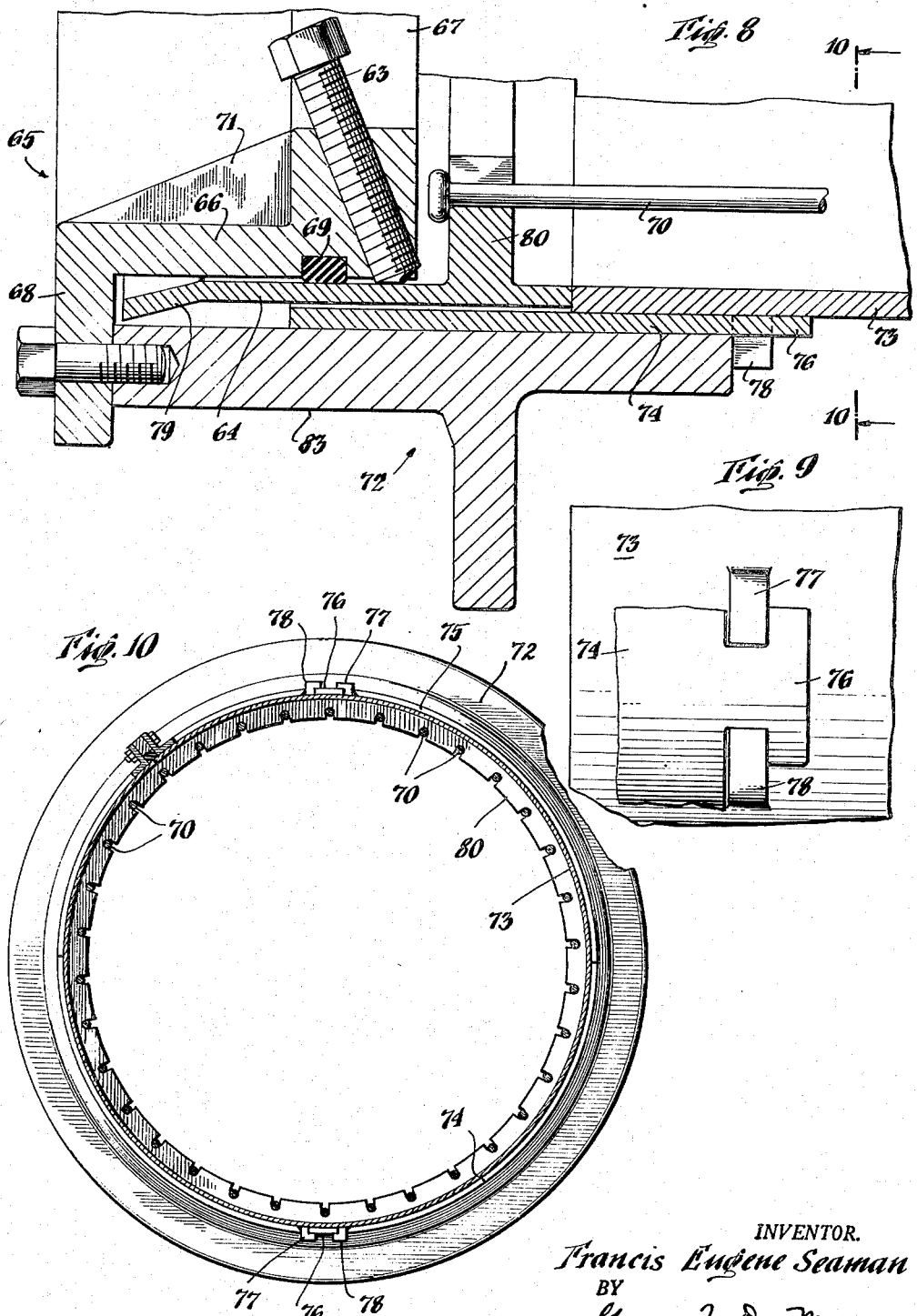
INVENTOR.
Francis Eugene Seaman
BY
George F. DesMarais
ATTORNEY Patented Aug. 24, 1954

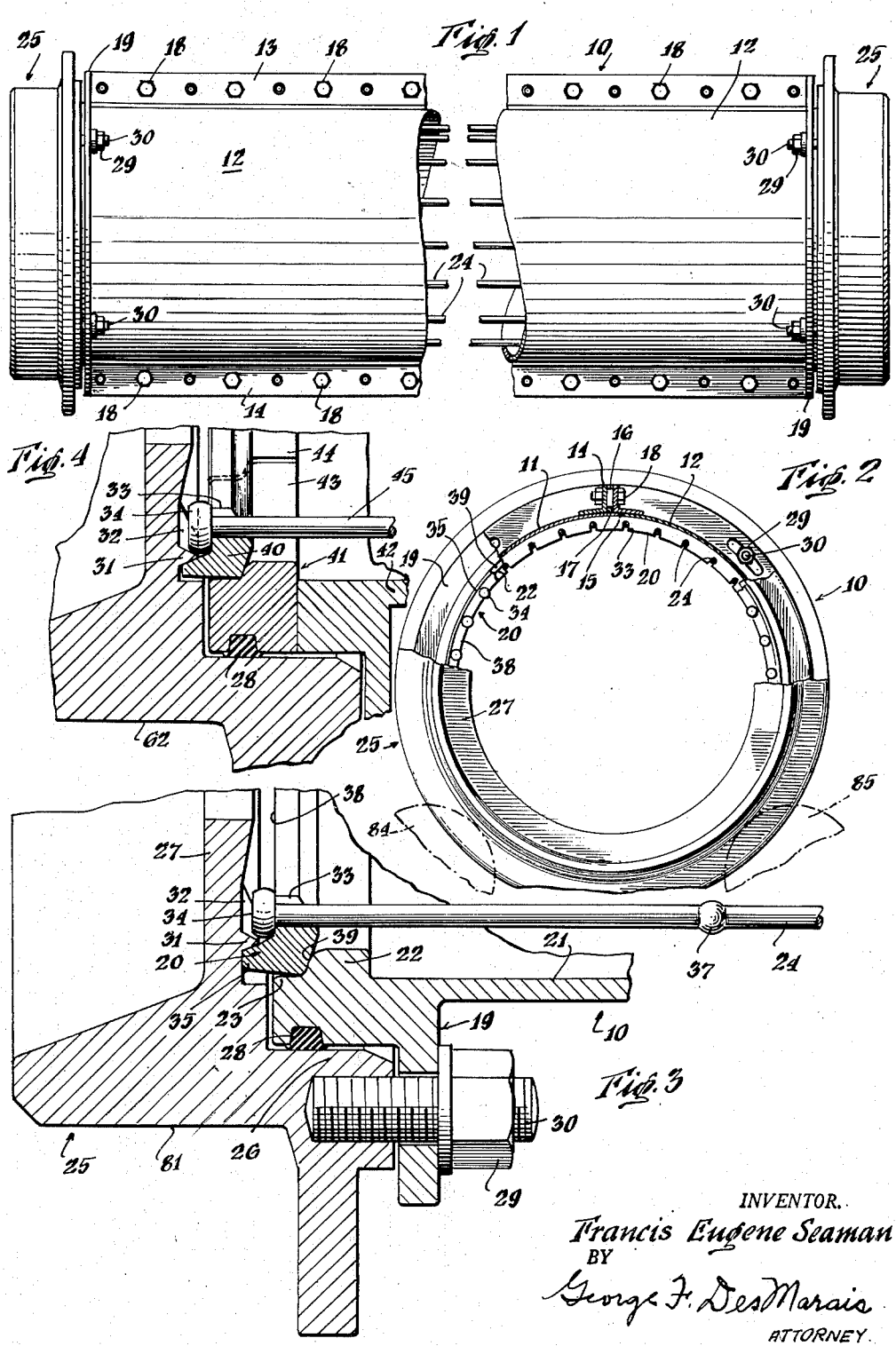

2,686,951

UNITED STATES PATENT OFFICE 2,686,951

MOLD FOR FABRICATING HOLLOW STRUCTURES

Francis Eugene Seaman, Wharton, N. J., assignor to Lock Joint Pipe Company, East Orange, N. J., a corporation of New Jersey Application March 6, 1952, Serial No. 275,087

14 Claims. (Cl. 25—127)

This invention relates to moulds for fabricating hollow structures, such, for example, as a structure comprising a tubular body of moulded material with prestressed tension members extending longitudinally therethrough and having their ends anchored to metallic rings which are sustained by the tubular body of moulded material and constitute permanent parts of the fabricated structure. A pipe section having a concrete conduit with tensioned wires or rods extending lengthwise therethrough and secured to steel rings which are sustained by the concrete, is a practical type of product for the fabrication of which the present invention is useful. In such a pipe section the rings commonly serve as joint rings which reinforce the ends of the pipe section and cooperate with a coupling device for connecting two sections together. The wires are under tension during the moulding and hardening of the concrete and the forces exerted by the wires are transferred from the mould to the concrete upon removal of the mould from the fabricated pipe section.

An object of the invention is to provide a mould which is so constructed as to support the joint rings and the tensioned members extending therebetween before the concrete or other mouldable material, such as a synthetic organic plastic, has hardened, and at the same time restrain the rings from being unduly distorted because of the eccentric load applied thereto by the tensioned members.

The mould comprises a tubular mould casing and mould ends which are assembled together and adapted to support the joint rings of a pipe section within the mould. The casing or means carried by the casing maintains the joint rings in spaced relationship against the action of the tensioned members which extend from one ring to the other. In a mould for making double-ended spigot pipe sections, the mould ends may be similar, but in a mould for making a pipe section with bell and spigot ends, the mould ends are appropriately formed to cooperate with the particular types of joint rings employed at the respective ends of the pipe section. Whatever the form of the mould end at either end of the mould casing, means are provided for counteracting the tendency of the joint ring or other anchoring means for the tensioned members to distort due to the rotational forces exerted thereon by the restraint to movement afforded by the mould casing and the pull of the tensioned members. The rotational forces are caused by the eccentric loading of the joint rings by a plurality of tensioned members, and since the total force exerted by the tensioned members may be of considerable magnitude, distortion of the joint rings would tend to occur unless it were restrained. Means are provided in accordance with the present invention to minimize or prevent such distortion as would materially affect the original shapes of the rings. It is important that the shapes of joint rings be dimensionally stable and true. The invention also has the advantage of enabling the use of relatively light weight rings and therefore effects economy in the manufacture of prestressed pipe sections.

The principle of the invention is illustrated in the accompanying drawing which shows by way of example several embodiments of means employing the invention. It is apparent that changes and alterations may be made in the portions of the mould casing and mould ends which cooperate with the joint rings to accommodate joint rings of other and different shapes and at the same time make use of the present invention for obtaining the results desired.

In the drawing:

Fig. 1 illustrates one form of mould embodying the present invention;

Fig. 2 is an end view of the mould illustrated in Fig. 1, with parts broken away for illustrating different sections of the mould;

Fig. 3 is an enlarged section through one end of the mould illustrated in Figs. 1 and 2;

Fig. 4 is a section similar to Fig. 3, but showing a modified form of the end of a mould casing;

Fig. 5 diagrammatically illustrates the application of forces on a joint ring mounted within the mould;

Fig. 6 illustrates a pipe section adapted to be fabricated in the mould illustrated in Figs. 1, 2 and 3;

Fig. 7 is an enlarged section through a mould having an end for supporting a bell ring;

Fig. 8 is a section of a modified form of mould end for supporting a bell or socket ring;

Fig. 9 is a detail at the outside of the mould casing shown in Fig. 8; and

Fig. 10 is a section on line 10—10 of Fig. 8.

The mould casing or shell 10 for moulding the perimeter of the concrete conduit may assume any conventional form which is adapted to be removed from a moulded structure. It may be a rolled sheet with a single longitudinal seam, or a casing formed of segmental plates attached together. The mould casing illustrated in Figs. 1 and 2 includes two semi-cylindrical steel plates 11 and 12 with angle irons 13 and 14 attached to each plate adjacent diametrically opposite longitudinal edges 15. The outwardly extending flanges of the angle irons adjacent the longitudinal edges of the respective plates are separated by a spaced strip 16, Fig. 2, by which a gasket 17 is held in place for sealing the longitudinal edges. The two plates 11 and 12 are held together by a plurality of bolts 18 which are removable for separating the plates for removing them from a moulded structure.

Howsoever the mould casing is formed, it preferably has a rim formation 19, either formed integrally with each plate, or built up from one or more curved bars secured together by welding, or in any other manner, for stiffening the end of the mould casing.

As clearly appears in Fig. 3, a ring 20 which is to serve as a joint ring at the spigot end of a pipe section, such as is illustrated in Fig. 6, has its perimeter located within the circumference of the moulding surface 21 of the mould casing 10. Each end of a mould casing for moulding a pipe section with spigots at either end is provided with an abutment or rib 22 extending radially inward of the moulding surface 21 and is preferably spaced from the extreme end of the casing so as to provide a recess having an annular surface 23 for locating a joint ring concentrically to the mould. The abutment 22 prevents movement of the ring axially inward and away from the end of the casing. The joint rings are brought up tightly and with considerable force against abutments adjacent either end of the mould casing by a plurality of tensioned wires or rods 24 which have their ends anchored to the rings.

The ends of the mould casing are partially closed by mould ends or end pieces 25. The mould end illustrated in Fig. 3 has a portion 26 partially overlapping the mould casing 10 longitudinally of the casing at its end, and an inwardly extending portion 27 which serves as a wall for moulding the end surface of a concrete conduit. A circumferential gasket 28 is contained between the mould end and the mould casing for preventing leakage of flowable moulding material from within the mould.

After a joint ring 20 has been placed in position within the recess at the end of the mould casing 10, the mould end 25 is mounted on and attached to the casing by the nuts 29 on the studs 30 extending from the mould end.

In prestressed pipe sections of the present type, it is common to employ a number of tension members circumferentially spaced from one another within the wall of the pipe section. These tension members are spaced from the outer wall of the pipe section and, since the joint rings are restrained from axial movement in a circular area adjacent the outer perimeter of the ring, the combined forces imparted to the ring by the tension members will tend to cause the ring to invert, that is to say, to turn inwardly or axially of the mould with respect to the outer perimeter of the ring. Distortion of the ring from this cause is minimized or prevented by an abutment which extends axially inward from the mould end and which is so formed as to overlie and contact with an axially extending portion of the ring. The abutment 31 illustrated in Fig. 3 extends circumferentially around the mould end and presents a continuous surface for abutting the ring 20. The abutment is provided with slots or recesses 32 corresponding in number and position to the radial slots 33 in the ring 20 through which the tension members 24 pass. The recesses are for accommodating the anchoring heads 34 at the ends of the tension members. They also provide spaces for receiving moulding material to cover the ends of the tension members. If desired, the abutment may be constituted of a series of lugs spaced apart around the mould end with each lug providing an abutment opposite a tension member 24.

In making a prestressed pipe section, the wires are provided in such number and are tensioned to such a degree as to impart the amount of compression desired on the moulded conduit or other structure. For example, for making a pipe section having an inside diameter of thirty inches and thirty-four wires with each wire exerting a tensile load of 7,500 pounds, the total force of the wires on each end of the mould would be of the order of 127.5 tons. When the mould is assembled and before the concrete has hardened, this total force is applied to each ring at one end of the mould. The force is eccentrically applied to a ring which is to constitute part of a pipe section (Fig. 6), and appreciable distortion of the ring is prevented by the counteracting action of the abutment 31 which overlies the toe 35 of the ring (Fig. 3). In Fig. 5, the forces acting upon a joint ring are diagrammatically represented. The force applied to any one section 36 by the tensioned members is indicated by the arrow F, and the force restraining axial movement of the ring is indicated at F'. These two forces are substantially equal and opposite and tend to cause rotation of the section. The rotation or inversion of the section is prevented by the force F'' which is applied to the toe of the ring.

The wires are connected to the rings at either end of the mould after the mould has been assembled with the end rings in place. Referring to Fig. 3, one end of each tension member 24 is attached to one of the rings and the member is then stretched until the head 34 at the other end may be engaged by the other joint ring 20. This may be accomplished by using a suitable tool (not shown), as, for example, a set of pivoted levers having a claw for engaging an enlargement 37 on the wire 24, and another claw for engaging the inwardly extending portion 27 of the mould end, and whereby, upon manipulation of the tool, the spacing of the two claws is reduced and the wire 24 is stretched sufficiently to pass the head 34 over the face 38 of the ring which faces outwardly of the mould.

The side face 39 of the abutment 22 which abuts the ring is preferably sloped inwardly of the mould from the outermost diameter of the side face 39 and with respect to a diametrical plane perpendicular to the axis of the mould. By sloping this side face slightly, a radial component of force is provided which acts outwardly on the abutment 22 and facilitates the removal of the mould casing, or abutment, from the finished product after the concrete has set.

In Fig. 4 there is illustrated the end of a mould in which a spigot ring 40 is supported. The mould may be similar to the mould previously described except that the abutting means 41 for the ring 40 are separable from the mould casing 42 and may be a split ring or a plurality of independent elements or segments 43, 44. The abutting means 41 are held against the mould casing by the tension members 45. When the mould casing is removed from the finished product, the abutting means 41 are lifted from the product.

In the foregoing description, moulds have been described in which a pipe section having one or both ends finished as spigots can be fabricated. If a pipe section is to have a bell at one end, the end of the mould for supporting the bell ring or socket band is appropriately modified. This may be accomplished in the manner illustrated in Fig. 7, in which a steel bell ring 46 is supported in abutting relationship to the end 47 of a mould casing 48. The tension members 49 are connected to the bell ring 46 after the bell ring is mounted in the mould. They are connected to an inwardly extending flange 50 which is secured to, or integral with, the bell ring 46. The combined force exerted by the members 49 holds the bell ring tightly against the end of the mould casing 48.

Before the members 49 are placed the bell ring 46 is supported in the mould by the mould end 51, a slidable wedge member 52, a ring member 53, and bolts and screws 54, 55. The mould end 51 has a radially extending portion 56 with an inside surface for moulding the end surface of a concrete conduit, an annular portion 57 extending alongside the inner side of the bell ring 46, and a rim portion 58 extending laterally from the latter portion beyond the free end of the bell ring and to outside of the circumference of the moulding surface of the casing 48. The ring member 53 is carried by the mould casing 48, and the screws 55 are adjustable for moving the mould end 51, the wedge member 52, and the bell ring 46 axially inward of the mould.

The wedge member 52 is in the form of a split ring to facilitate its removal. It has a radial surface 59 for engaging the surface of the flange 50 which faces outwardly of the mould, and a peripheral surface 60 for engaging the inside surface of the bell ring. The wedge member 52 also has a sloping surface 61 which slopes similarly to and is engaged by a surface extending circumferentially of the mould end 51. By tightening the screws 55 the bell ring 46 is centralized with respect to the axis of the mould and the wedge member 52 may be made to bear with considerable pressure against the flange 50 and the bell ring 46 and prevent undue distortion thereof. If desired, the wedge member 52 may be made secure to the flange 50 and to the bell ring 46 by welding with substantially the same results.

In the modification illustrated in Figs. 8 and 10, adjustable screw elements 63 are positionable for bearing on the inside surface of a bell ring 64. The mould end 65 includes an annular portion 66 of the mould end which is located at the inside of the bell ring, a flange portion 67 for moulding the end surface of a concrete conduit, and a rim portion 68 extending radially outward from the annular portion 66 to beyond the outer periphery of the bell ring 64. The mould end is grooved for supporting a gasket 69 in sealing relationship to the inner surface of the bell ring to prevent leakage of cementitious or other moulding material from within the mould.

The screw elements 63 are engaged in threaded holes tapped in the mould ring and as many screw elements are employed as there are tension members 70. As shown in Fig. 8, a bracket 71 is located in the plane of each screw for buttressing the radially extending portion 67 of the mould end.

The mould end 65 is fastened to a ring member 72 which is located around the bell ring 64 and overlaps with the end of the mould casing 73. Between the ring member 72 and the mould casing there is a pair of curved plates 74, 75, each of which has a projection 76 in the form of a T for engaging a pair of positioning lugs 77, 78, by which the plates are located with respect to the mould casing 73. The lugs are welded on the outer surface of the mould casing. The plates are separable to enable their removal when the bell ring has a sloping rim portion 79 at its mouth. When the bell ring is mounted in the mould in the position shown in Fig. 8, the screws 63 are advanced to bear upon the inside surface of the bell ring, and the tension members 70 are then secured to the inwardly extending flange 80 of the bell ring. Since the screws are brought tightly to bear on the bell ring before the members 70 are tensioned and secured thereto, the bell ring is firmly held against distortion.

In the drawing, the mould ends have been illustrated as providing circular surfaces 81 (Fig. 3), 82 (Fig. 7), and 83 (Fig. 8) to enable the mould ends to be supported on rollers 84, 85 (Fig. 2), by which the mould may be roated for centrifugally moulding concrete. It is to be understood, however, that the mould need not be supported through the mould ends and that the invention is applicable to non-rotatable moulds.

While the present invention has been described in connection with the moulding of a prestressed pipe section having similar or different types of joint rings, it is to be understood that the principle of the invention is susceptible of use in other combinations for preventing undue distortion of rings of other forms.

What is claimed is:

1. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end removably mounted on one end of said casing and formed to mould one end of said tubular body of moulded material, means for locating one of said rings concentrically to said mould adjacent said end of said casing, means for abutting one side of said ring for preventing movement of said ring axially inward and away from said mould end, and means carried by said mould end for engaging and exerting force on said ring in opposition to the rotational forces imposed on said ring by said tensioned members and said abutting means.

2. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end removably mounted on one end of said casing and formed to mould one end of said tubular body of moulded material, an abutment carried by said casing and extending radially inward of said casing adjacent said end thereof, said abutment being spaced with respect to said mould end to provide space between said mould end and said abutment for accommodating one of said rings, and means carried by said mould end for engaging said ring to minimize distortion of said ring due to rotational forces imposed thereon by said tensioned members and said abutment.

3. The combination described in claim 2 in which said abutment comprises abutting means separable from said mould casing.

4. The combination described in claim 2 in which the side face of said abutment facing said mould end is sloped inwardly of the mould from its outermost diameter and with respect to a diametrical plane perpendicular to the axis of the mould.

5. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, means carried by said casing for locating one of said rings adjacent an end thereof, a mould end removably mounted on one end of said casing and formed to mould one end of said tubular body of moulded material, said mould end having an element extending inward from said mould end and axially of said mould, said element having an abutting surface for abutting a surface of said ring to prevent rotation of said ring with respect to said first-named means.

6. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end formed to mould one end of said tubular body of moulded material, means carried by said casing and connecting with said mould end for supporting said mould end and for holding one of said rings between said mould end and said casing, said casing and said mould end each having a surface for abutting different surfaces of said ring thereby to hold said ring against the pull of said tensioned members and to constrain said ring against inversion.

7. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end, means assembled on said casing and secured to said mould end for supporting said mould end, and means for locating one of said rings concentrically to said casing and for bearing against said ring to prevent distortion thereof.

8. The combination described in claim 7 in which said ring-locating means includes a wedge member between said mould end and said ring.

9. The combination described in claim 8 in which said wedge member is a split ring.

10. The combination described in claim 7 in which said ring-locating means includes a plurality of screw elements in threaded engagement with said mould end and bearing on said ring.

11. The combination described in claim 7 in which means are provided for adjusting the position of said mould end relative to said casing.

12. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end formed to mould one end of said tubular body of moulded material, said mould end having an annular portion extending axially along and within one of said rings and a rim extending laterally from said annular portion to outside of the circumference of the moulding surface of said casing, and means outside of said casing and fastened to said rim for supporting said mould end.

13. In a mould for fabricating a hollow structure such as a tubular body of moulded material with tensioned members extending longitudinally therethrough and having their ends anchored to metallic rings which are sustained by the moulded material and constitute permanent parts of the fabricated structure, a tubular mould casing, a mould end formed to mould one end of said tubular body of moulded material, a plurality of screw elements in threaded engagement with said mould end and bearing on one of said rings, and means for supporting said mould end with respect to said casing.

14. The combination described in claim 13 in which said supporting means include a ring member outside of said one of said rings and overlapping a portion of said casing, and spacing elements disposed between said portion of said casing and said ring member, said spacing elements extending between said ring member and said ring.

References Cited in the file of this patent

UNITED STATES PATENTS

| Number | Name | Date |
| --- | --- | --- |
| 2,550,858 | Parrett | May 1, 1951 |
| 2,569,612 | Laurent | Oct. 2, 1951 |
| 2,602,979 | Van Buren | July 15, 1952 |